United States Patent
Strong

(10) Patent No.: US 10,389,416 B2
(45) Date of Patent: Aug. 20, 2019

(54) METHOD AND APPARATUS FOR BEAM PATTERN STABILIZATION

(71) Applicant: Cambium Networks Limited, Ashburton, Devon (GB)

(72) Inventor: Peter Strong, Ipplepen (GB)

(73) Assignee: CAMBIUM NETWORKS LIMITED, Devon (GB)

( * ) Notice: Subject to any disclaimer, the term of this patent is extended or adjusted under 35 U.S.C. 154(b) by 0 days.

(21) Appl. No.: 15/175,204

(22) Filed: Jun. 7, 2016

(65) Prior Publication Data

US 2017/0331533 A1  Nov. 16, 2017

(30) Foreign Application Priority Data

May 13, 2016 (GB) .................................. 1608425.3

(51) Int. Cl.
| | |
|---|---|
| *H04B 7/0456* | (2017.01) |
| *H04L 5/14* | (2006.01) |
| *H04B 7/06* | (2006.01) |
| *G01C 19/00* | (2013.01) |
| *G01C 21/18* | (2006.01) |
| *G01P 5/18* | (2006.01) |
| *H04L 25/02* | (2006.01) |

(Continued)

(52) U.S. Cl.
CPC ........... *H04B 7/0456* (2013.01); *G01C 19/00* (2013.01); *G01C 21/18* (2013.01); *G01P 15/18* (2013.01);

(Continued)

(58) Field of Classification Search
CPC ..... H04L 5/0001; H04L 5/14; H04L 25/0206; H04L 25/0228; H01Q 1/2283;

(Continued)

(56) References Cited

U.S. PATENT DOCUMENTS 4,920,655 A  *  5/1990  Van Steenwyk ....... G01C 21/16
                                                           33/304
5,321,410 A  *  6/1994  Hipp ........................ G01S 3/52
                                                           342/442

(Continued)

OTHER PUBLICATIONS

Bolandhemmat et al., "Active Stabilization of Vehicle-Mounted Phased-Array Antennas," in IEEE Transactions on Vehicular Technology, vol. 58, No. 6, pp. 2638-2650, Jul. 2009.*

(Continued)

*Primary Examiner* — Michelle M Koeth

(74) *Attorney, Agent, or Firm* — Brinks Gilson & Lione

(57) ABSTRACT

Methods and apparatuses for beam pattern stabilization are provided. A method may include processing an output of a gyroscopic sensor to generate a plurality of first phase corrections for a first time interval and a plurality of second phase corrections for a second time interval. The method may further include measuring respective signal propagation characteristics between each antenna element of the array and each of a first and second subscriber module for the first time interval. The method may further include forming, based on the measured respective signal propagation characteristics, the plurality of first phase corrections, and the plurality of second phase corrections, a MU-MIMO beam pattern for the second time interval having a main lobe towards the first subscriber module and a null towards the second subscriber module, whereby to correct for a change in orientation of the array between the first time interval and the second time interval.

10 Claims, 11 Drawing Sheets

(51) Int. Cl.
*H04B 7/0452* (2017.01)
*G01P 15/18* (2013.01)
*H04B 7/10* (2017.01)

(52) U.S. Cl.
CPC ......... *H04B 7/0452* (2013.01); *H04B 7/0617* (2013.01); *H04L 5/14* (2013.01); *H04L 25/0206* (2013.01); *H04L 25/0228* (2013.01); *H04B 7/10* (2013.01)

(58) Field of Classification Search
CPC .......... H01Q 3/2605; H01Q 3/30; H01Q 3/36; H04B 7/0634; H04B 7/086; H04B 7/0452; H04B 7/0617; H04B 7/0456; H04B 7/10; H04W 16/28; H04W 88/08; G01C 19/00; G01C 21/18; G01P 15/18
See application file for complete search history.

(56) References Cited

U.S. PATENT DOCUMENTS

| | | | | |
|---|---|---|---|---|
| 7,583,169 B1* | 9/2009 | Scardelletti | ............. | H01P 1/127 333/105 |
| 9,935,699 B2* | 4/2018 | Kim | ..................... | H04B 7/0452 |
| 2007/0155336 A1 | 7/2007 | Nam et al. | | |
| 2010/0093282 A1* | 4/2010 | Martikkala | ............ | H04B 17/14 455/63.4 |
| 2010/0159844 A1* | 6/2010 | Yamazaki | ............ | H01Q 3/2605 455/69 |
| 2013/0027341 A1* | 1/2013 | Mastandrea | ............ | G06F 3/014 345/173 |
| 2013/0308717 A1* | 11/2013 | Maltsev | ............... | H04B 7/0417 375/267 |
| 2014/0347222 A1* | 11/2014 | Ling | ........................ | H01Q 3/40 342/373 |
| 2016/0118716 A1 | 4/2016 | Stephenne et al. | | |

OTHER PUBLICATIONS

Mousavi et al., "A Low-Cost Ultra Low Profile Phased Array System for Mobile Satellite Reception Using Zero-Knowledge Beamforming Algorithm," in IEEE Transactions on Antennas and Propagation, vol. 56, No. 12, pp. 3667-3679, Dec. 2008.*
International Search Report and Written Opinion of the International Searching Authority for counterpart International Application No. PCT/GB2017/051309, dated Aug. 30, 2017.

* cited by examiner

METHOD AND APPARATUS FOR BEAM PATTERN STABILIZATION

RELATED APPLICATIONS

This application claims the benefit of UK Patent Application No. GB 1608425.3, filed May 13, 2016, and entitled "METHOD AND APPARATUS FOR BEAM PATTERN STABILISATION," the entire contents of which is incorporated herein by reference.

BACKGROUND

1. Technical Field

The present disclosure relates generally to an access point in a point to multipoint wireless network and to methods of operating the access point, and more specifically, but not exclusively, to a method of stabilisation of a beam pattern emitted from or received by an array of antenna elements at an access point of a wireless communication network.

2. Background

Modern wireless communication networks are typically placed under great demands to provide high data capacity within the constraints of the allocated signal frequency spectrum. In cellular wireless communication networks, capacity may be increased by re-using frequencies between cells, typically according to a predetermined frequency re-use pattern. A fixed wireless access system may comprise a base station, which may be referred to as an access point, typically mounted on an antenna tower, and a number of subscriber modules installed at customer premises. The area of coverage of an access point may be divided into sectors, each sector being used to transmit and receive with a respective cell. Capacity may be further increased within a cell by steering respective beams towards specific user equipments, which may be referred to as subscriber modules, to allow communication between the access point with improved gain and/or reduced interference reception in comparison with a beam covering a sector. The access point may be equipped with an antenna array and a beamformer for each sector, for forming beams for communication with each respective subscriber module. Capacity may be increased still further by employing Multi-User Multiple Input Multiple Output (MU-MIMO) beamforming, in which respective beams may be simultaneously directed at different subscriber modules selected for a MU-MIMO group, each beam carrying different data. The subscriber modules selected for membership of a MU-MIMO group have sufficient spatial separation that each beam may be directed at one member of the group, while nulls in the radiation pattern of the beam are steered to the other members of the group, to avoid interference between members of the group.

A set of MU-MIMO beam patterns may be formed by applying a beamforming weightset to a weighting matrix. The weighting matrix takes a number of input signals, and applies appropriate amplitude and phase weights to each input signal for transmission from each element of an antenna array, in order to form the respective MU-MIMO beam to transmit each input signal to the respective subscriber module. The beamforming weightset may be calculated on the basis of channel estimates, which relate to the amplitude and phase characteristic of the radio frequency propagation path through each transmit chain and each element of the antenna at the access point to each subscriber unit. The channel estimates may be calculated on the basis of sounding symbols having pre-determined phase and amplitude characteristics, which may be transmitted from the access point for reception at subscriber modules. The subscriber modules may then determine the channel estimates from the phase and amplitude characteristics of the received sounding symbols, and send response messages back to the access point indicating the determined channel estimates.

The antenna array at the access point is typically mounted on a tower to give good coverage of a sector. The antenna array may be subject to wind loading, which may be exacerbated by the height of the tower, resulting in a buffeting effect which may cause a perturbation of the orientation of the array, typically an oscillation through a small angle. A MU-MIMO beam pattern may be particularly sensitive to a change in orientation in azimuth with regard to maintaining a null towards a subscriber unit, since a null may be very narrow in angular terms. It may be possible to track the effects of a change in the orientation of the array by the frequent sending of sounding symbols to produce frequent updates of the channel estimates. However, this may result in a high level of signalling overhead due to the frequent channel sounding.

It is an object of the disclosure to mitigate the problems of the prior art.

BRIEF SUMMARY

In accordance with a first aspect of the disclosure there is provided a method of stabilising at least one Multi User Multiple Input Multiple Output MU-MIMO beam pattern formed by an array of antenna elements at an access point of a point to multi-point wireless communication network comprising a plurality of subscriber modules, the method comprising:

processing an output of a gyroscopic sensor to generate a plurality of first phase corrections for a first time interval and to generate a plurality of second phase corrections for a second time interval;

measuring respective signal propagation characteristics between each antenna element of the array and each of a first and second subscriber module for the first time interval; and forming, based on the measured respective signal propagation characteristics, based on the plurality of first phase corrections and based on the plurality of second phase corrections, a MU-MIMO beam pattern for the second time interval having a main lobe towards the first subscriber module and a null towards the second subscriber module, whereby to correct for a change in orientation of the array between the first time interval and the second time interval.

This allows stabilisation of the MU-MIMO beam pattern without incurring the signalling overhead that may be associated with sounding the propagation channel sufficiently often to track the effects of a change in orientation of the array due to the effects of wind on a fixed installation of the access point on a tower.

In an embodiment of the disclosure, the plurality of first phase corrections comprises a respective first phase shift value for each antenna element of the array; and the method comprises correcting each measured respective signal propagation characteristic by the respective first phase shift value.

This provides an efficient method of correcting each measured respective signal propagation characteristic for the effects of movement of the antenna array.

In an embodiment of the disclosure, the plurality of second phase corrections comprises a respective second phase shift value for each antenna element of the array; and
said forming the MU-MIMO beam pattern comprises:
generating a first weightset for a beamforming weights matrix based on the corrected measured respective signal propagation characteristics; and
correcting the first weightset by applying the respective second phase shift value for each element of the array.

This provides an efficient method of correcting each output of the beamforming weights matrix for each element of the array to stabilise the beam pattern. The correction is an approximation, because the relationship between a change in radiofrequency phase slope across an array and the resulting change in azimuth angle of a null or lobe of the beam pattern depends on the azimuth angle, typically on the cosine of the azimuth angle. For example, a change in phase slope that produces a 1 degree change at boresight, that is to say normal to the array, may produce approximately a 0.7 degree change in azimuth at + or −45 degrees to boresight. The approximation has been found to give a useful stabilisation of the beam pattern across the sector served by an access point subject to wind loading. In an embodiment of the disclosure, the method comprises:
applying respective correction factors to each output of the beamforming weights matrix to correct for respective signal transmission characteristics between each respective output of the beamforming weights matrix and the respective antenna element,
wherein said correcting the first weightset comprises correcting each output of the beamforming weights matrix for the respective second phase shift value by applying each respective second phase shift value to the respective correction factor.

Applying the correction factors to correct for signal transmission characteristics between each respective output of the beamforming weights matrix and the respective antenna element allows a predictable beam pattern to be formed on the basis of a precise model of the antenna and the transmit channels which is held in a control processor forming the beam patterns. The precise model allows the processor to translate a rotation measured by the gyroscopic sensor into phase shifts for respective elements of the array, to correct for motion of the antenna array.

In an embodiment of the disclosure, the method comprises:
generating the respective correction factors by measuring respective signal propagation characteristics between each respective output of the beamforming weights matrix and the respective antenna element by a process comprising:
coupling a sample from each signal transmitted from each output of the beamforming weights matrix to each respective antenna element;
removing the respective second phase shift from each coupled sample; and
updating the respective correction factors on the basis of the coupled samples with the respective second phase shift removed.

This allows a precise correction for the motion of the array, on the basis of the respective signal propagation characteristics.

In an embodiment of the disclosure, processing an output of a gyroscopic sensor comprises:
generating the first phase shift values and the second phase shift values based on a single approximation factor relating a change in array orientation to a change in radiofrequency phase.

This allows for an efficient approximate correction for a change in the orientation of the array for signals transmitted and/or received irrespective of azimuth angle within the sector covered by the array.

In an embodiment of the disclosure, forming the MU-MIMO beam pattern comprises:
correcting each measured respective signal propagation characteristic for a change in orientation of the array between the first time period and the second time period based on the plurality of first phase corrections and the plurality of second phase corrections; and
generating forming the MU-MIMO beam pattern based on the corrected measured respective signal propagation characteristics.

This allows for an accurate correction for a change in the orientation of the array for signals transmitted and/or by providing correction phase values specific to the azimuth angle for each subscriber module to which a beam or a null of the MU-MIMO beam pattern is steered.

In an embodiment of the disclosure, the array of antenna elements is an integral part of the access point, and the gyroscopic sensor is mounted within the access point.

This allows the gyroscopic sensor to be used to accurately measure the orientation of the array.

In an embodiment of the disclosure, the access point comprises a calibrated integrated module comprising transmit chains and the array of antenna elements.

This allows a precise correction for the motion of the array, based on an accurate antenna model based on the positions of the antenna elements and the radio frequency propagation paths within the module, which are reliably maintained by virtue of being part of the integrated module.

In an embodiment of the disclosure, the access point is mounted on an antenna tower and said change in orientation of the array is due to wind.

In an embodiment of the disclosure, the change in orientation of the antenna array is a change in azimuth angle.

In an embodiment of the disclosure, the gyroscopic sensor is a rate gyro, and said output of the gyroscopic sensor is an angular rotation rate.

In an embodiment of the disclosure, the processing of the output of the gyroscopic sensor comprises:
integrating the angular rotation rate and removing a mean value to determine an azimuth angle; and
determining a respective phase shift value for each antenna element of the array from the azimuth angle and from stored data regarding the geometry of the array.

This provides an accurate correction for the orientation of the array.

In an embodiment of the disclosure, the first time interval is a first time division duplex period and the second time interval is a subsequent time division duplex period.

This allows for a correction for movement of the array between the first and second time intervals.

In accordance with a second aspect of the disclosure, there is provided an access point for a point to multi-point wireless communication network comprising a plurality of subscriber modules, the access point comprising:
an array of antenna elements;
a digital beamforming weights matrix for applying a weightset to one or more signals streams;
a respective transmit chain for each antenna element;
a gyroscopic sensor; and
a processor configured to:
process an output of the gyroscopic sensor to generate a plurality of first phase corrections for a first time interval and to generate a plurality of second phase corrections for a second time interval;

measure respective signal propagation characteristics between each antenna element of the array and each of a first and second subscriber module for the first time interval; and form, based on the measured respective signal propagation characteristics, the plurality of first phase corrections and the plurality of second phase corrections, a Multi User Multiple Input Multiple Output MU-MIMO beam pattern for the second time interval having a main lobe towards the first subscriber module and a null towards the second subscriber module, whereby to correct for a change in orientation of the array between the first time interval and the second time interval.

In an embodiment of the disclosure, the access point may have one or more of the following features: each respective transmit chain is connected to the antenna array using printed conductors; the circuit design and physical layout of the radio frequency transmission paths for each transmit chain to the respective antenna element is the same for each antenna element; the physical layout of the access point provides a fixed spacing between the radio frequency transmission paths for each antenna element; and/or the radio frequency isolation between each antenna element is at least 30 dB at an operating frequency of the antenna element. These features may each contribute to the predictability of the beam pattern and the predictability of the relationship between azimuth angle of the beam pattern and respective phase shift values for each element. This may allow the generation of phase shift values on the basis of the output of a gyroscopic sensor to stabilise a beam pattern with improved accuracy for use at an access point of a point to multi-point wireless communication network using MU-MIMO beams.

Further features of the disclosure will be apparent from the following description of preferred embodiments of the disclosure, which are given by way of example only.

DETAILED DESCRIPTION

By way of example, embodiments of the disclosure will now be described in the context of a fixed wireless access system operating a time division duplex system based on IEEE 802.11 standards at carrier frequencies typically between 5 and 6 GHz. However, it will be understood that this is by way of example only and that other embodiments may involve other wireless systems and frequencies, and embodiments are not restricted to a specific frequency band of operation or a specific standard, and may involve operation in licensed or unlicensed bands.

Figure 1:
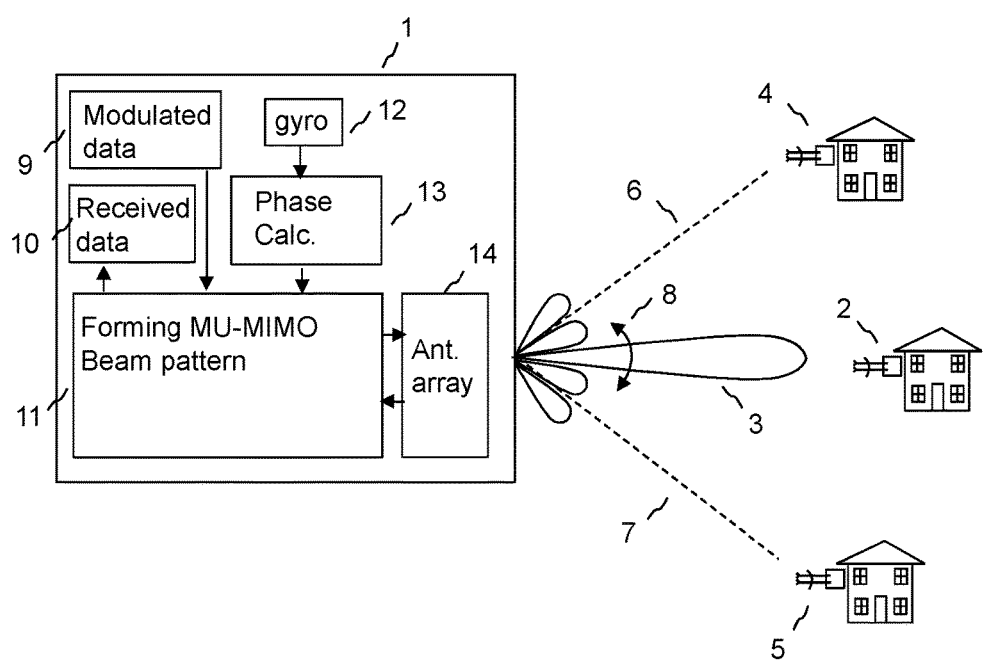
FIG. 1 is a schematic diagram showing an access point forming a MU-MIMO beam to a subscriber unit, and forming a null to at least a second subscriber unit, the access point being arranged to stabilise the beam pattern on the basis of a gyroscopic sensor in an embodiment of the disclosure.
Figure 2:
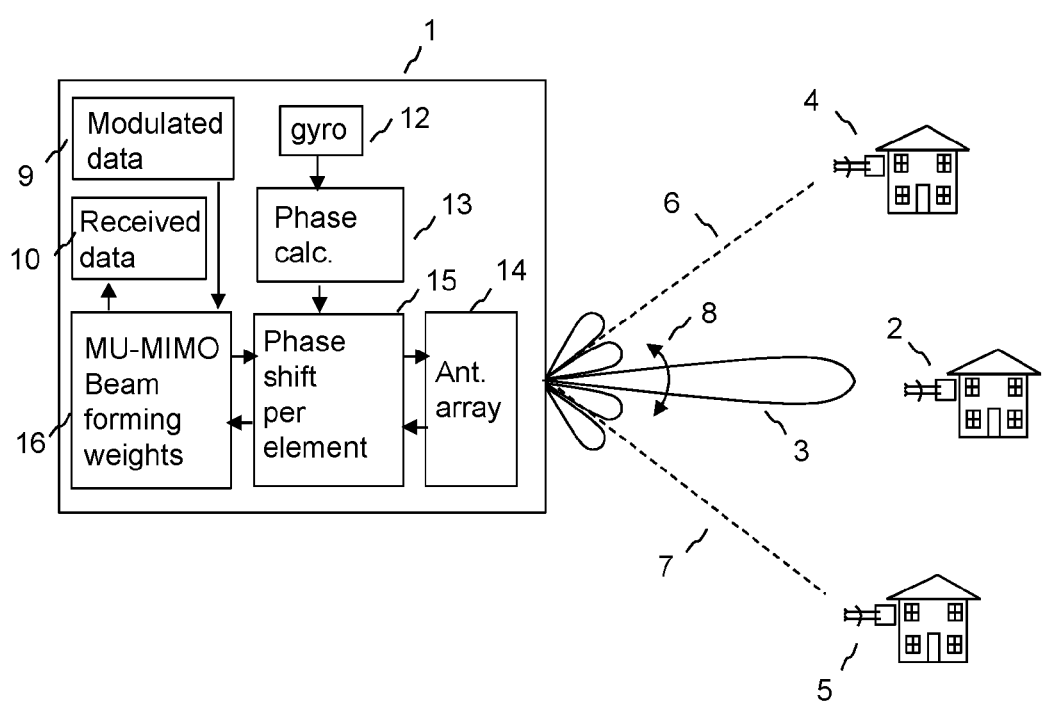
FIG. 2 is a schematic diagram showing a first embodiment of an access point in which phase corrections are applied to an output and/or input of a beamforming weights matrix.
Figure 3:
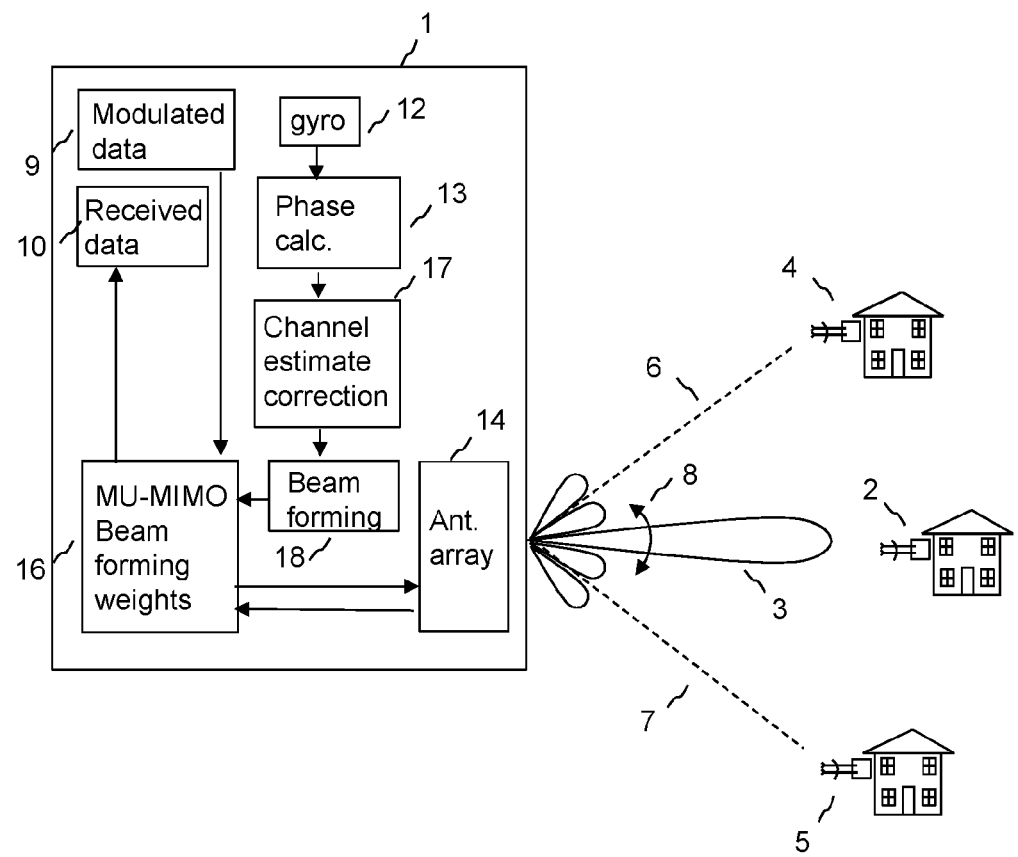
FIG. 3 is a schematic diagram showing a second embodiment of an access point in which phase corrections are applied to channel estimates used to generate beamforming weights for a MU-MIMO beam pattern.

FIGS. 1, 2 and 3 are schematic diagrams showing an access point 1 according to embodiments of the disclosure for use in a point to multipoint wireless communication network comprising the access point and a plurality of subscriber modules 2, 4, 5. The access point 1 has an array 14 of antenna elements, each element being arranged to transmit a signal that is appropriately weighted in amplitude and phase to form a Multi User Multiple Input Multiple Output (MU-MIMO) beam pattern. The antenna array, and typically the whole access point, may be mounted on an antenna tower, typically at an orientation that is set on installation. The array of antenna elements may be an integral part of the access point. The array, and/or the access point, may be susceptible to a change in orientation, typically by a small angle, for example 4 degrees and typically less than 2 degrees peak to peak, due to the effects of wind loading. In a conventional point to multipoint fixed wireless access system, in which sector antennas are used at the access point to give coverage of a sector of typically 90 degrees, a small change in the orientation of the array may have little effect. However, in a fixed wireless access system configured to form MU-MIMO beam patterns, the effects of a change in the orientation of the array, in particular in azimuth, due to wind loading may potentially cause degradation of system performance unless some corrective action is taken. In particular, a null 6 to a subscriber module 4 formed in the beam pattern may be very narrow in azimuth angle, so that a small disturbance 8 in the orientation of the array in azimuth may steer the null 6 away from the subscriber unit 4. As a result, on reception, signals received from the subscriber module 4 may appear as interference to the signals received from another subscriber module 2 to which a beam 3 is formed, and on transmission, transmitted signals which are intended for reception by an intended subscriber module 2 may appear as interference to another subscriber module 4.

Typically, the MU-MIMO beam patterns may be formed by well-known techniques on the basis of channel sounding 5 of the propagation channel between each element of the antenna array and each subscriber module in a MU-MIMO group. Channel sounding may be performed periodically, to update the channel sounding results to take account of changes in the propagation environment. It may be possible to use periodic channel sounding to correct for the effects of a change in the orientation of the array and/or access point due to wind loading. However, frequent channel sounding may have an impact on system capacity due to the need to send sounding symbols having pre-determined content and the associated signalling overhead.

In embodiments of the disclosure, as shown in FIG. 1, a gyroscopic sensor 12, typically a microelectromechanical systems (MEMS) device which may be mass-produced for use, for example, in mobile phones, is used to measure changes in the orientation of the array, so that appropriate phase corrections can be generated according to the orientation of the array at different times. The phase corrections may be used to form 11 a MU-MIMO beam pattern to correct for a change in orientation of the array from a first time interval, in which channel sounding is carried out, to a second time interval, in which a MU-MIMO beam pattern is used for transmit and/or receive based on the channel sounding estimates.

As shown in FIG. 2, the phase corrections may be applied as phase shifts 15 to the signals transmitted and/or received from each element of the array to stabilise the beam pattern in azimuth against changes in the orientation of the array. This allows a pre-calculated beam pattern to be used, by correcting for a change in orientation of the array between the time that channel sounding was performed as the basis of the generation of the beam pattern, and the time that the beam pattern is applied. This allows less frequent channel sounding, reducing signalling overhead. The correction is an approximation, because the relationship between a change in radiofrequency phase slope across the array and the resulting change in azimuth angle of a null or lobe of the beam pattern depends on the azimuth angle, typically on the cosine of the azimuth angle. For example, a change in phase slope that produces a 1 degree change in azimuth from 0 degrees azimuth may produce approximately a 0.7 degree change in azimuth from an azimuth angle of + or −45 degrees. In this example 0 degrees azimuth is assumed to be boresight for the array, that is to say an angle normal to the array in a horizontal plane. However, the approximation has been found to give a useful stabilisation of the beam pattern across the sector served by an access point subject to wind loading, especially correction of small deviations of typically +/−1 degree from a reference position, the reference position being an orientation in the absence of wind loading. In particular, one or more nulls in the MU-MIMO beam pattern at different azimuth angles may be maintained with a null depth of typically 30 dB by this method, even given the errors due to the approximation. In the absence of beam stabilisation, the nulls may degrade to 20 dB or less for a +/−1 degree deviation, reducing system capacity due to interference from subscriber units of a MU-MIMO group towards which nulls are intended to be formed. Applying each respective second phase shift for each element of the array as a phase slope to correct the weightset used to form a MU-MIMO beam has the advantage of simplicity of implementation. The phase shifts can be applied digitally to the outputs, or inputs, of each element of a beamforming weights matrix without affecting the beamforming process, which can be performed based on a reference orientation of the array.

In an alternative embodiment, as shown by FIG. 3, the phase corrections generated by processing the output of the gyroscopic sensor may be used to correct 17 signal propagation characteristics for a change in orientation of the array between a first time period when the sounding was performed and a second time period when the beam pattern is to be applied, and the corrected signal propagation characteristics may be used as the basis of the generation of the beam pattern 18 which may be applied by beamforming weights 16, which may be a weightset for a beamforming weights matrix. This may be more accurate than applying a phase shift to each element of the array, but may be more computationally intensive.

In embodiments of the disclosure, at least the analogue parts of the transmit and/or receive chains and the antenna array are built as an integrated module, which is calibrated for the radio frequency transmission characteristics of each transmission path to and/or from each antenna element. This allows an accurate prediction of the beam pattern that would result from a given beamforming weightset, and allows a processor to calculate accurate correction phases to apply to each antenna element signal to correct for changes in azimuth angle detected by the gyroscopic sensor.

In the embodiment of FIG. 2, on transmit, MU-MIMO beamforming weights 16 are applied to modulated data 9 to form a weighted signal stream for each element of an array. A respective phase shift 15, which may be frequency dependent, is applied to the weighted signal stream for each element to correct for a change in orientation of the array 14. The phase shifted weighted signal streams are transmitted by respective elements of the antenna array 14. A phase shift at baseband causes a corresponding phase shift at radiofrequency when baseband signals are upconverted. The phase shifts are calculated 13 on the basis of the output from the gyroscopic sensor 12.

On reception, signals are received from each element of the antenna array 14, and the received signals are phase shifted by a respective phase shift 15 for each element. The phase shifts are calculated 13 on the basis of the output from the gyroscopic sensor 12. In a time division duplex (TDD) system, in which signals are alternately transmitted and received at the same frequency, the phase shifts applied for transmit and receive may be the same for a given orientation. The respective phase shifted signal streams are weighted by the MU-MIMO beamforming weights 16, which, in a TDD system may be the same as used for transmit, to form a combined received signal stream which may be demodulated to produce received data 10.

The gyroscopic sensor 12 is positioned to monitor the orientation of the array, typically the orientation in azimuth. The gyroscopic sensor 12 may be mounted within the access point 1, which is typically integrated with the array 14.

The radio frequency channel dynamics of the system as illustrated by FIGS. 1, 2 and 3 may be dominated by movement of the access point, in cases of wind loading. This is because the intrinsic MU-MIMO radio channel to each subscriber module tends to be stable in a fixed wireless system with line of sight and near line of sight links. The normal approach to coping with rapidly varying channel would be to increase the sounding rate. This is avoided by using the gyroscopic sensor.

At least one Multi User Multiple Input Multiple Output MU-MIMO beam pattern may be formed by the array 14 of antenna elements at the access point 1 by applying a weightset to a beamforming weights matrix. The beamforming weights matrix typically allows several MU-MIMO beams to be formed simultaneously, so that data may be transmitted to and/or received from several subscriber modules in a MU-MIMO group simultaneously. Each MU-MIMO beam is arranged to steer a beam to the wanted subscriber module and to steer nulls to other subscriber modules of the MU-MIMO group. The members of the MU-MIMO group may be chosen as a subset of subscriber modules from the plurality of subscriber modules which have a suitable angular separation to allow a beam to be steered to one while a null is steered to the others of the MU-MIMO group. The respective phase shifts applied to the signal for each antenna element to correct for the orientation of the array may be applied as a separate operation to the application of the weightset, or the phase shifts may be incorporated into the weightset as corrections. Both methods amount to correcting the weightset by applying the respective phase shift value for each element of the array.

The output of the gyroscopic sensor 12 may be processed to generate a respective first phase shift value for each antenna element of the array for a first time interval and to generate a respective second phase shift value for each antenna element of the array for a second time interval.

Processing the output of the gyroscopic sensor may comprise generating the first phase shift values and the second phase shift values based on a single approximation factor relating a change in array orientation to a change in radiofrequency phase. This may provide a computationally efficient implementation.

The single approximation factor may be derived as follows. The radiofrequency phase slope across the array is typically proportional to the sine of the beam azimuth angle assuming boresight, that is to say an angle normal to the array, corresponds to an azimuth of 0 degrees. The radiofrequency phase slope correction, that is to say phase shift value, across the array is proportional to the cosine of the change in beam azimuth angle, again assuming boresight corresponds to an azimuth of 0 degrees. Taking an example of an array covering a sector of 90 degrees, that is to say a +/−45 degree azimuth range, it can be seen that the cosine of the azimuth angle, cos(az), ranges from 0.707 to 1 to 0.707 according to the azimuth angle being considered, that is to say the azimuth angle to the subscriber module to which a beam or null is steered. Approximating cos(az) over the 90 degree sector by a fixed value of 0.853 gives a peak approximation error of 0.146=1−0.853=0.853−0.707. In this sense, for a beam directed on boresight, an azimuth rotation is corrected with an accuracy of ~15% ie ~0.146/cos(0). This correction may be sufficient to give a useful increase in performance.

So, it can be seen that the exact ratio of phase correction to rotation angle for a given element of the array is not a constant but depends on the intended beam direction. The ratio may be approximated by a constant selected to maximise or increase the null depth for all beam directions over the azimuth region of interest. The consequence of the approximation if that after correction for a given rotation, there may be an effective residual rotation that has not been compensated. The residual rotation is smaller than the original rotation and so the system behaves with a smaller effective rotation. For a typical envelope of operation of 90 degree azimuth, the residual rotation is less than 15% of the actual rotation. So for a 1 degree rotation, the effective error after correction is less than 0.15 degree for any beam direction. An uncorrected 1 degree rotation error could cause a perfect null to degrade to less than 20 dB preventing 64QAM operation whereas with a 0.15 degree effective error, the null depth is still more than 30 dB allowing 64QAM operation. This is therefore a potentially useful improvement.

The time interval may be a time division duplex period, which may be less than 10 ms, for example 2.5 ms. Respective signal propagation characteristics between each antenna element of the array and each of a first and second subscriber module may be measured for the first time interval, and each measured respective signal propagation characteristic may be corrected by the respective first phase shift value. A first weightset for the beamforming weights matrix may be generated on the basis of the corrected measured respective signal propagation characteristics to form a MU-MIMO beam pattern having a main lobe towards the first subscriber module and a null towards the second subscriber module.

Each output of the beamforming weights matrix may be corrected by the respective second phase shift value, to correct for a change in orientation of the array between the first time interval and the second time interval to maintain a null towards the second subscriber module.

In an embodiment of the disclosure, the respective signal transmission characteristics between each respective output port of the beamforming weights matrix and the respective antenna element may be calibrated, to determine respective correction factors. This allows the MU-MIMO beam pattern and the phase shift for the signal for each antenna element to be accurately determined from the angular measurement derived from the gyroscopic sensor output, on the basis of a precise model of the antenna and the transmit channels which is held in a control processor forming the beam patterns. The respective correction factors are applied to each beamforming weights matrix output to correct for the respective signal transmission characteristics between each respective output of the beamforming weights matrix and the respective antenna element.

The respective phase shift values calculated by processing the output from the gyroscopic sensor may be conveniently applied by applying each respective second phase shift value to the respective correction factor. So, correcting each beamforming weights matrix output for the respective second phase shift value may comprise applying each respective second phase shift value to the respective correction factor.

The respective correction factors may be generated by measuring respective signal propagation characteristics between each respective port of the beamforming weights matrix and the respective antenna element by coupling a sample from each signal transmitted from each port to each respective antenna element, removing the respective second phase shift from each coupled sample, and updating the respective correction factors on the basis of the coupled samples with the respective second phase shift removed.

In an embodiment of the disclosure, the gyroscopic sensor is a rate gyro, and the output of the gyroscopic sensor is an angular rotation rate. Processing the output of a gyroscopic sensor to generate a respective phase shift value for each antenna element of the array may comprise integrating the angular rotation rate and removing a mean value to determine an azimuth angle. This may give a very accurate indication of azimuth angle. Alternatively, a sensor with an output directly indicating azimuth angle may be used. The respective phase shift value may be determined for each antenna element of the array from the azimuth angle and from stored data regarding the geometry of the array.

Figure 4:
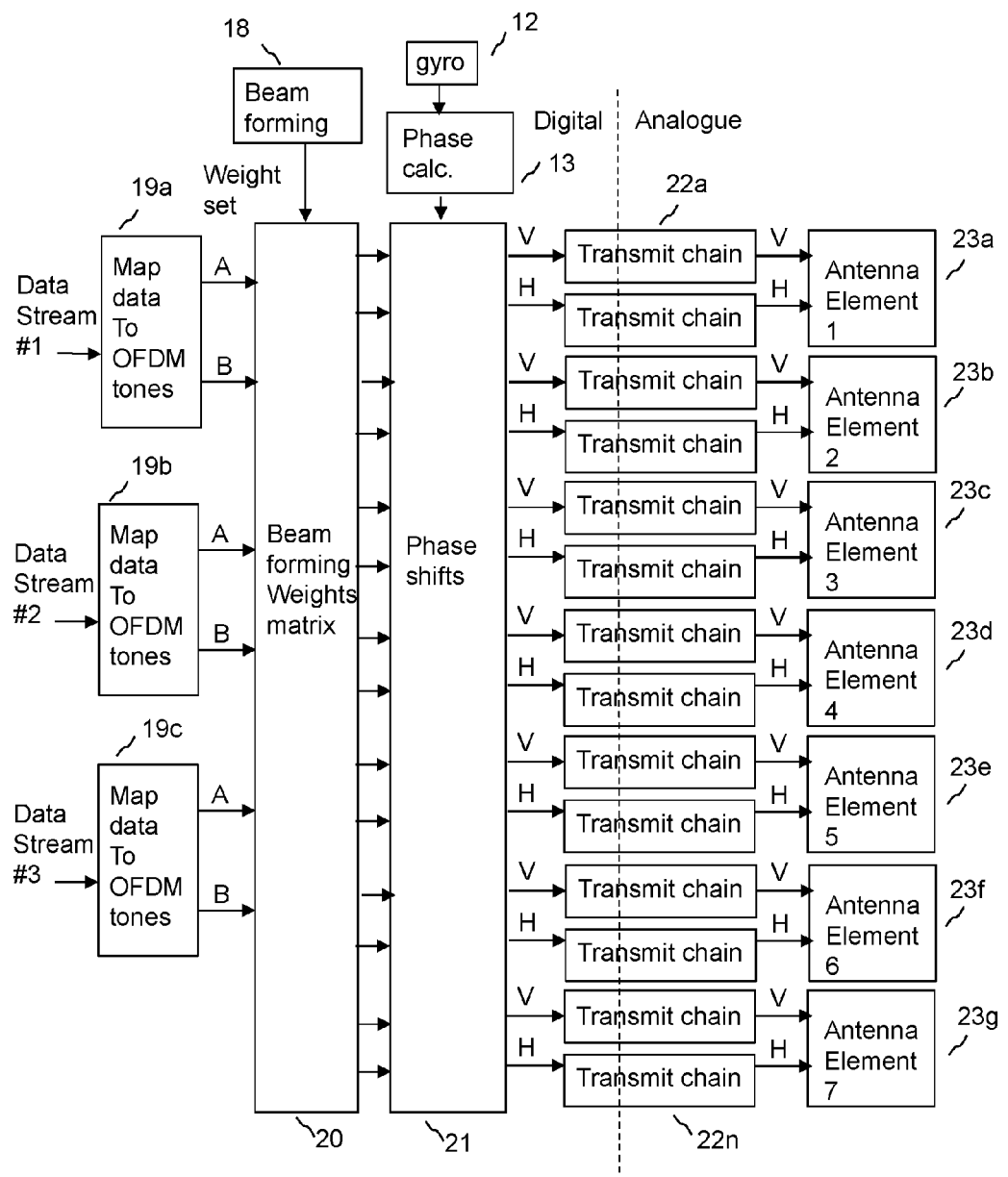
FIG. 4 is a schematic diagram showing a beamforming arrangement for transmission in an access point in an embodiment of the disclosure.

FIG. 4 is a schematic diagram showing a transmission architecture for the access point. In this example, there is at least one input data stream, which is mapped to a series of Orthogonal Frequency Division Multiplexing (OFDM) tones by mapping functional block 19a. Two streams of OFDM tone values are created, A and B. If a polarisation diversity transmit scheme is used, then A will be a duplicate of B, so that the same data may be transmitted on both polarisations. This gives robust operation. If a polarising multiplexing approach is taken, then the data stream will be split between steam A and stream B of OFDM tone values, so that stream A and stream B are different and each carries part of the data stream. This increases data capacity. An OFDM tone value is a representation of an amplitude and phase of a tone, also referred to as a subcarrier, for an OFDM symbol. This may be typically a vector having an Inphase and Quadrature value. Data may be encoded in the tone value using QAM (Quadrature Amplitude Modulation) modulation.

Streams of OFDM tone values A and B are fed to the beamforming weights matrix 20. The beamforming weights matrix applies a weightset generated by a beamforming function 18, for example using feedback from a subscriber module, to the streams of OFDM tone values. Typically each OFDM tone value is weighted in amplitude and phase by a respective weight value for each nominally vertically polarised (V) and horizontally polarised (H) component for each antenna element. The weighting is typically performed using complex I (Inphase) and Q (Quadrature) components. The weight applied may be different for different subcarriers, so that the weight may be frequency dependent. The weightset is calculated by the beamforming function to form an appropriate beam shape when transmitted from the antenna array for the intended mode of operation, for example a MU-MIMO beam pattern. The weighted OFDM tone values for respective V and H components for respective antenna elements are fed to respective transmit chains 22a-22n.

The beamforming weights matrix 20, which may also be referred to as a weights matrix or as a beamformer, is typically a digital signal processing function which may be implemented by well-known methods of implementing digital signal processing functions, such as by a programmable logic array, a suitably programmed digital signal processing chip, or as an application specific integrated circuit, or as a combination of these. The beamforming weights matrix typically comprises an array of beamforming weights for each MU-MIMO beam and a combiner that combines the weighted output from each beamforming weight for each respective element. So, typically, on transmit, each signal from a signal source is split into identical copies to be fed to a beamforming weight for each antenna element, and for each beam. Each beamforming weight applies an amplitude and phase modulation to each signal. The weighted signals for each beam are combined for each element. In embodiments of the disclosure, a respective further phase shift 21 is applied to the combined signal for each element.

In a typical transmit chain, OFDM tone values, having been appropriately weighted, are applied to an IFFT block, which may form an OFDM symbol by applying an Inverse Fourier Transform to a set of OFDM tone values for subcarriers of the symbol. Inphase and quadrature streams of time domain samples may be formed at the output of the IFFT block. The input to the IFFT block is typically also in Inphase (I) and Quadrature (Q) form. A cyclic prefix may be added to each of the Inphase and Quadrature streams of time domain samples for the symbol at the output of the IFFT block. Each stream of time samples may be converted to the analogue domain by a DAC (Digital to Analogue converter). Each analogue signal may then be upconverted by up converter, which typically includes a complex IQ modulator and radio frequency mixers and amplifiers to translate the typically baseband Inphase and Quadrature signals up in frequency, using a radio frequency signal source. The modulated signals are then typically amplified by power amplifiers, and fed to an appropriate polarisation input of an antenna array element, typically a patch antenna, or a single antenna element formed from an array of patches, for example a vertical array of patches.

As shown in FIG. 4, analogue signals at radio frequency are output from respective transmit chains and connected to respective antenna elements of an array of antenna elements as shown 23a-23g, in this case an array of 7 elements, each element having an input for transmission on each of two orthogonal polarisations, in this case nominally vertical V and horizontal H. Radiation from each antenna element combines to form an appropriately shaped MU-MIMO beam pattern. The weightsets applied for each polarisation may be independent, so that beams may be formed independently on each polarisation.

In the example of FIG. 4, three data streams are shown: data stream #1, data stream #2 and data stream #3. The architecture is not limited to having three data streams; only one data stream may be used for some modes. There may be other modes of operation possible in addition to MU-MIMO mode, for example for a sector mode in which a broad beam is formed to cover a sector, for example a 90 degree sector. For MU-MIMO mode, there may be any number of data streams up to the number of simultaneous MU-MIMO streams to be transmitted. A weightset for the beamforming weights matrix is applied to the data streams, by first mapping 19a, 19b, 19c each data stream to a stream of OFDM tone values, and then applying a respective weight from the weightset to each tone value for each polarisation of each antenna element. Weighted tones for each data stream are combined together by superposition for transmission to a respective transmit chain.

As shown in the embodiment of FIG. 4, a respective phase shift value 21 is applied to each output of the beamforming weights matrix 20 to correct for the orientation of the array. The phase shift values are calculated 13 on the basis of the output of the gyroscopic sensor 12. Separate phase shift values may be applied for each of the vertical and horizontal polarisations V and H. Also, for each polarisation value, for each element, the phase shift values may be frequency dependent, so that the phase shift values may comprise a respective phase shift for each subcarrier of an OFDM symbol, that is to say the phase shift values may be a matrix of phase shift, typically applied digitally as Inphase and Quadrature (I and Q) components, as a function of frequency.

Figure 5:
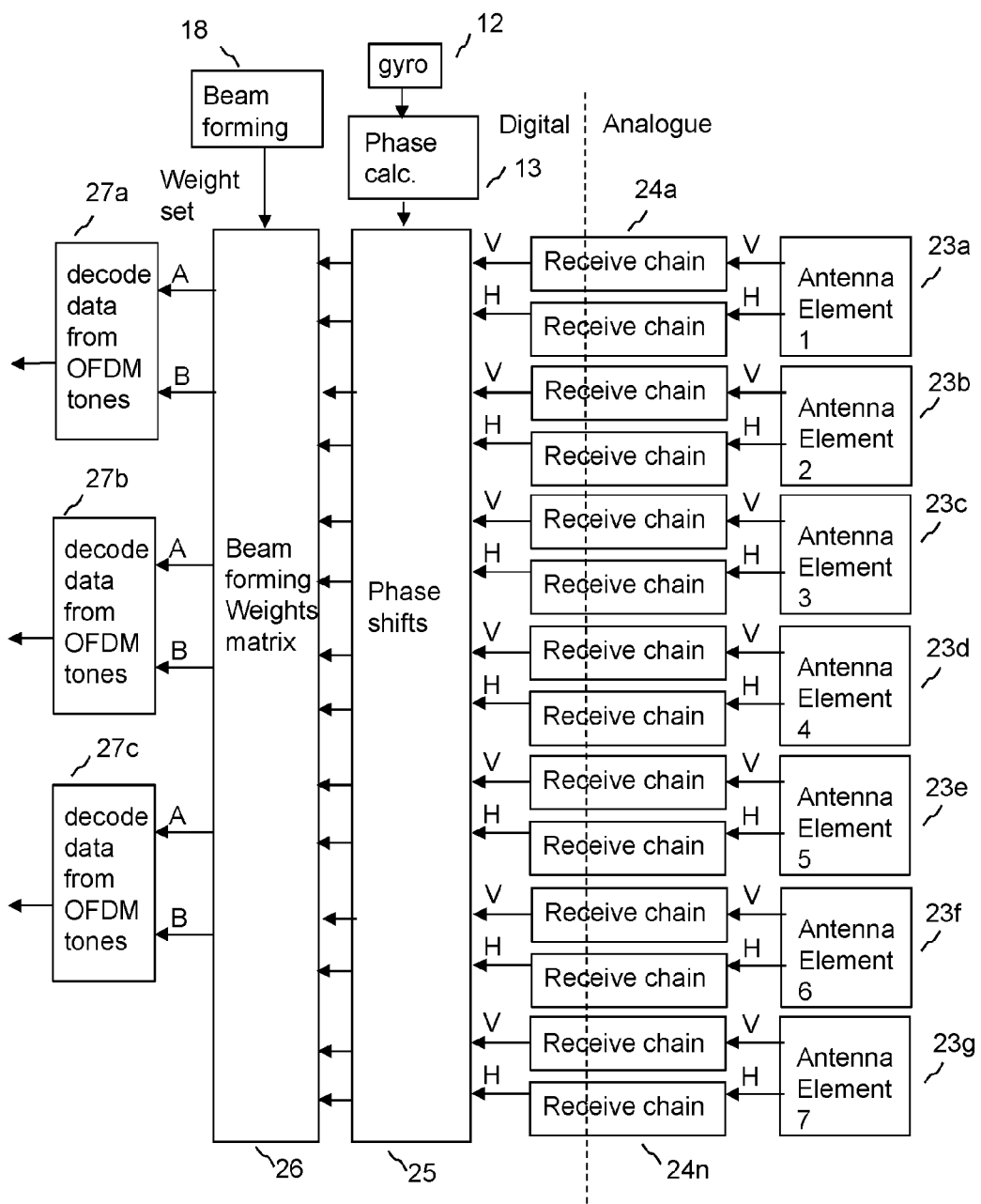
FIG. 5 is a schematic diagram showing a beamforming arrangement for reception in an access point in an embodiment of the disclosure.

FIG. 5 is a schematic diagram showing a receive architecture for the access point. Signals flow in the reverse direction to those shown in the transmit architecture of FIG. 4. There may be transmit/receive switches or couplers connected to each antenna element to allow both the transmit and receive architectures to be connected to the same antenna elements 23a-23g. The access point may operate in a time division duplex manner, in which the transmit and receive frequencies are the same. In this case, the antenna characteristics, and the propagation channels between the access point and each subscriber module, may be reciprocal, that is to say the same for transmit and receive. This simplifies the calculation of the beamforming weights for a MU-MIMO beam, and simplifies the calculation of the respective phase shift values to correct for the orientation of the array.

Signals received by the array of antenna elements 23a-23g, typically at orthogonal polarisations V and H, may be connected to respective receive chains 24a-24n, and each respective received signal is phase shifted by a respective phase shift value 25. The phase shifted signals are then passed to the beamforming weights matrix 26, which may then apply beamforming weights to generate a MU-MIMO beam as generated by a beamforming function 18. The receive beamforming weights may correspond to the transmit beamforming weights in a time division duplex system. The beamformed outputs of the beamforming weights matrix, which correspond to signals received in each MU-MIMO beam pattern that is formed, which may consist of OFDM tones of an OFDM symbol, each corresponding to a subcarrier amplitude and phase, may then be decoded 27a, 27b, 27c to form respective decode data streams.

In a typical receive chain 24a-24n, the received signals for each antenna element are amplified by a low noise amplifier, and then down converted from radio frequency, typically 5-6 GHz, by downconverter, using radio frequency source as a local oscillator. The signals are down converted typically to baseband in Inphase and Quadrature components. The baseband signals are then converted to the digital domain in the Analogue to Digital Converter (ADC). The cyclic prefix, if used, is discarded and the received symbol is then translated to the frequency domain using Fast Fourier Transform (FFT), to detect amplitude and phase values for each subcarrier of an OFDM symbol. The detected amplitude and phase values for each subcarrier for each polarisation for each antenna element may then be phase shifted by the respective phase shift value calculated on the basis of the output from the gyroscopic sensor to correct for the orientation of the array. The phase shifted subcarrier values may then be weighted by beamforming weights generating one or more MU-MIMO beams in a beamforming weights matrix, and combined into respective beamformed OFDM symbols for the respective MU-MIMO data streams, each being from a respective subscriber module of the MU-MIMO group. Data from each subscriber module is then decoded from each OFDM symbol.

It has been found that the antenna radiation pattern of each antenna element, the isolation between antenna elements, the spatial arrangement of the antenna elements, and the gain and phase of the transmit chains and cable runs to the antenna elements affect the beam pattern. The gain and phase of the transmit chains and/or receive chains may change with time, in particular as a function of temperature. A MU-MIMO beamforming weightset, and respective phase shift values, may be determined based at least on a known spatial separation of the antenna elements, a polar radiation model for an antenna element of the array, for example a measured polar plot for one or more of the antenna elements, and the calibrated phase and gain of each respective transmit chain. On receive, the phase and gain of each respective receive chain may be calibrated.

The array gain for the beam pattern in a given direction may be calculated by well-known techniques based on the superposition of the relative gain and phase of signals transmitted or received from each antenna element in that direction. This calculation takes into account the spatial arrangement of the antenna elements, and may also take into account a polar radiation model of each antenna element. The polar radiation model of each antenna element may be the same, or a separate polar radiation model may be used for each element. So, in particular the magnitude of the radiation in the given direction may be taken into account in calculating the array gain in that direction.

Figure 6:
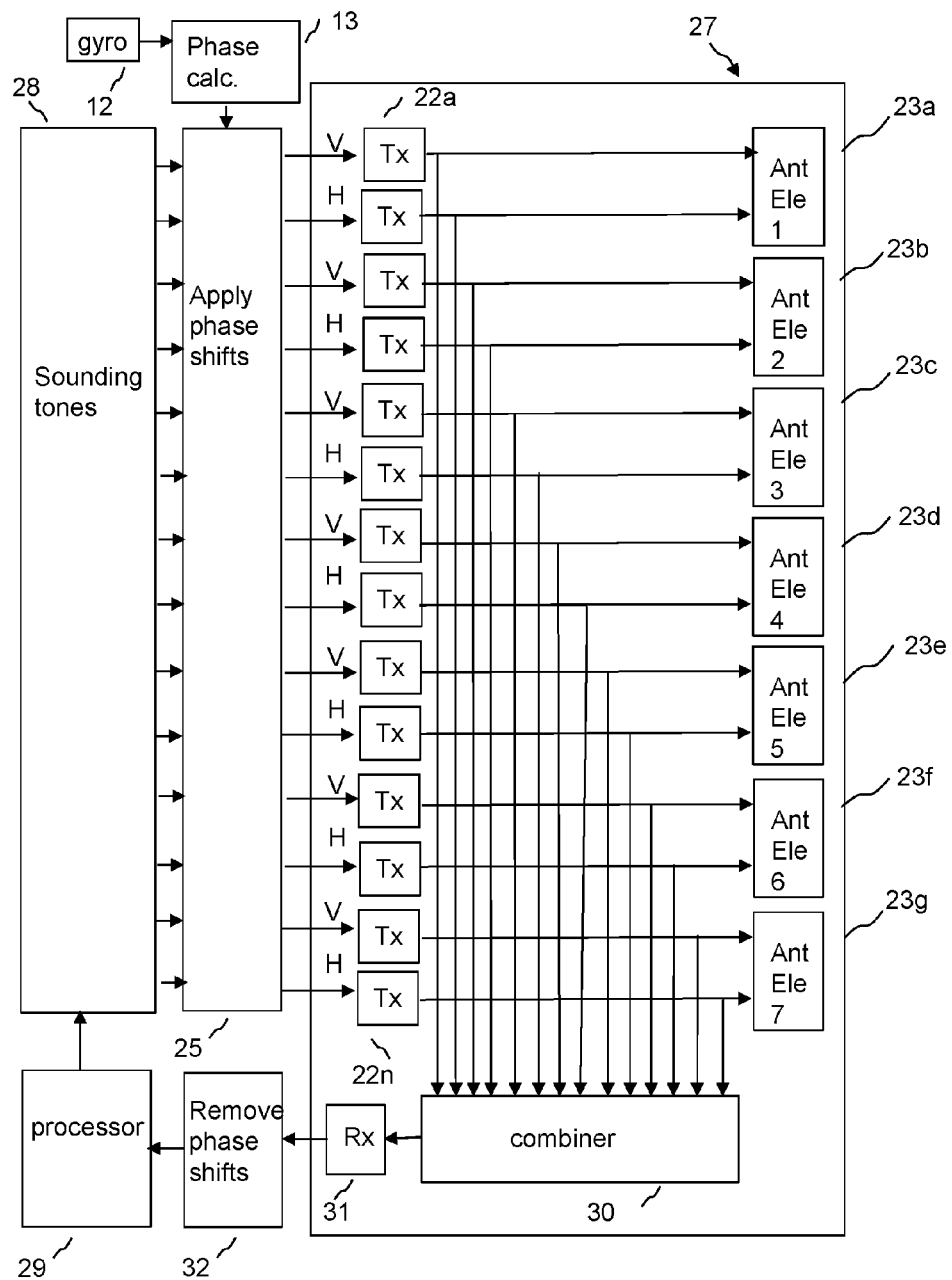
FIG. 6 is a schematic diagram showing an arrangement for measuring respective signal propagation characteristics between each respective port of the beamforming weights matrix and the respective antenna element.

FIG. 6 shows a calibrated module 27 which comprises transmit chains 22a-22n and antenna elements 23a-23g in an embodiment of the disclosure. A coupler is provided at the output of each transmit chain 22a-22n, which is arranged to couple a proportion of the signal power output from the transmit chain from the connection from the transmit chain to the antenna element. The coupled signal power is connected to a signal combiner 30, which combines the signals coupled from each transmit chain into a single channel. The combined signal is fed to a receive chain 31. The architecture illustrated in FIG. 6 may use a sounding tone in which each transmit chain is allocated a subset of subcarriers, so that it is possible to determine which tone has passed through which transmit chain after combination of the tones. Alternatively, a separate receive channel may be used for each transmit chain.

As shown in FIG. 6, the phase shift values calculated on the basis of the output of the gyro may be applied to the sounding tones before the sounding tones are applied to the transmit chains. This simplifies operation, since the phase shift values may be applied irrespective of the mode of operation, for example for MU-MIMO transmit mode in addition to sounding mode. As shown in FIG. 6, the respective phase shift values applied to the sounding tones are removed 32 from the respective sounding tones on reception, before comparison in the processor with the transmitted sounding tones. This is so that respective correction factors may be calculated which relate to transmission characteristics of the transmit chains and are not related to the output of the gyroscopic sensor at the time of calibration of the calibrated module 27.

The calibrated module 27 provides the antenna array 23a-23g, the respective transmit chains 22a-22n and the combiner network 30 for the combined channel as an integrated unit, typically in a single enclosure, arranged to impede changing of the relative special arrangement of the antenna elements by an operator. The antenna elements of the antenna array may be formed from patch radiator elements, which are typically planar metallic structures disposed in a parallel relationship to a ground plane. The patch radiator elements may be held in position in relation to the ground plane by, for example, being printed on a non-conductive film such as polyester, which is held in position on projections from the ground plane. The ground planes of the antenna elements may be fixed together, or formed as a single piece, so that the relative spatial arrangement of the antenna elements cannot be changed in normal use by an operator. The radio frequency interconnections between the transmit chains 22a-22n and respective antenna elements 23a-23g may be formed of printed tracks on a printed circuit board, so that that signal propagation properties will be stable with time. Similarly, the respective signal paths from the output of each transmit chain to the combiner may be formed of printed tracks on a printed circuit board, and are typically passive. This allows a calibration, for example a factory calibration, to be carried out for the gain and phase of each of the signal paths from the output of each transmit chain to the output of the combiner, and of the paths from each transmit chain to the respective antenna elements. This calibration may be used in the calibration of the transmission phase and gain of each transmit chain.

The calibrated module 27 may typically use a symmetrical design. The benefit of a symmetrical design is that unknown but symmetrical characteristics such as power amplifier droop and phase twist, feed delays and so on are not important, if they are the same for all chains, in calculating MU-MIMO beam pattern and phase shift values for correction for the orientation of the array. This translates into a symmetrical hardware design where all elements of the analogue signal paths, including feed networks, RF chains, and PCB layout are identical and repeated with a fixed spacing.

Sounding tones may be generated for use in calibrating the calibrated module 27. The sounding tones, typically predetermined OFDM subcarrier amplitude and phase values to be used for test purposes, including calibration of the transmit chains, may be transmitted from a sounding tone transmitting functional block 28. A processor 29 may hold the sounding tone values in memory. The sounding tones may be sent by a processor through the beamforming weights module (not shown), with weights set to predetermined values, for connection to the transmit chains, in which the frequency domain tones are converted to time domain sounding symbols.

The sounding symbols coupled from the output of each transmit chain may be combined in combiner 30 and the combined sounding symbols may be connected to receive chain 31, and the output of the receive chain, comprising amplitude and phase values for each received tone of the symbols, may be connected to processor 29. The processor may compare the amplitude and phase of the transmitted and received tones, generating calibration data for the respective transmit chains, taking into account the calibrated radio frequency paths from the output of each transmit chain through the combiner and the receive chain.

In the receive chain 31, the combined sounding symbols may be down converted typically to baseband in Inphase and Quadrature components. The baseband signals are then converted to the digital domain and the received symbol may then be translated to the frequency domain using Fast Fourier Transform, to detect amplitude and phase values of each sounding tone. The processor 29 may compare amplitude and phase values of the received tones with the transmitted amplitude and phase values of each tone, to calibrate the transmission phase and gain of each transmit chain. Relative transmit phases and gains of the transmit chains may be calculated. The known transmit phases and gains may then be used to calibrate the receive chains for each antenna element, by coupling some of the transmitted power into the receive chains.

Figure 7:
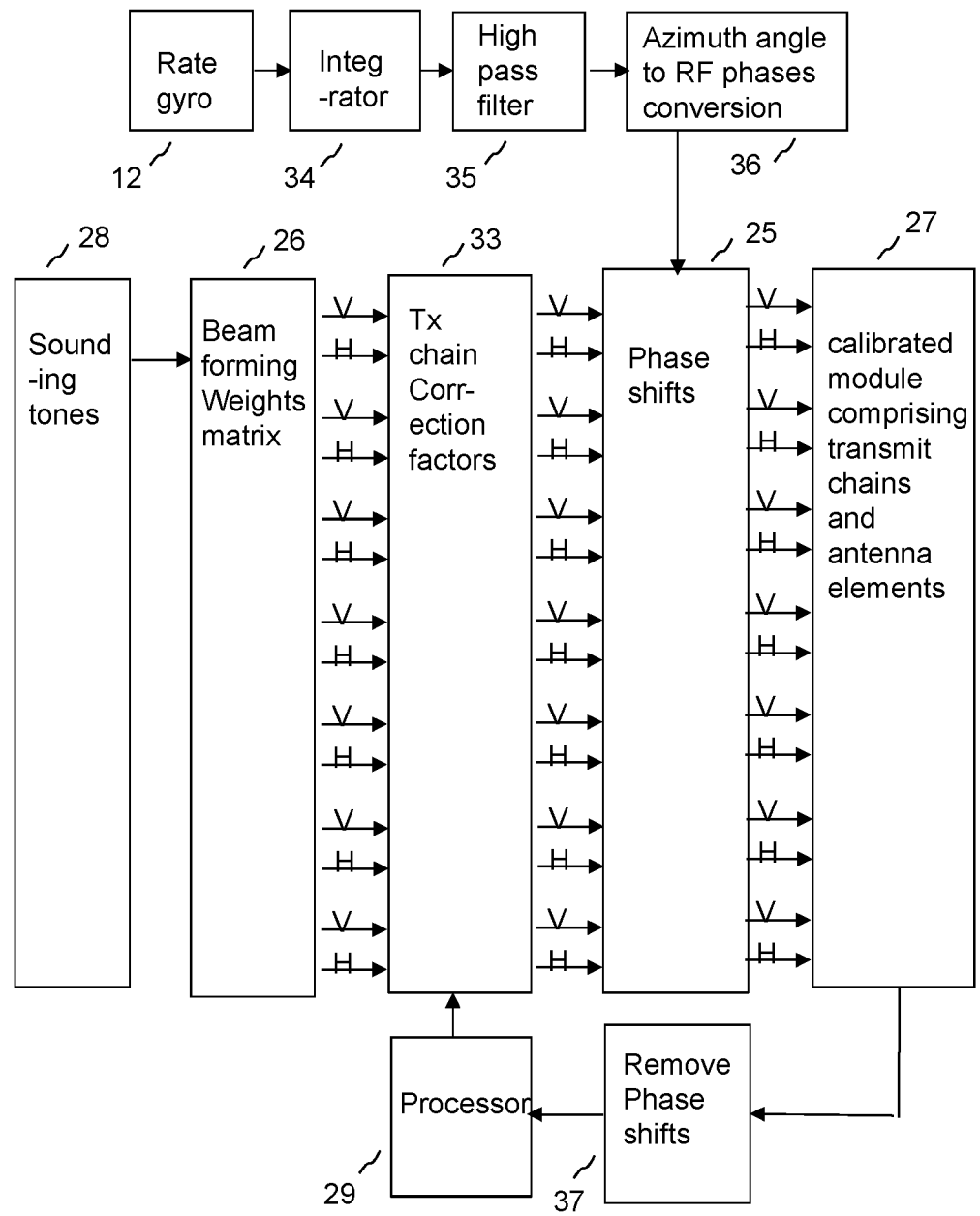
FIG. 7 is a schematic diagram showing a transmission architecture for an access point arranged to measure respective signal propagation characteristics between each respective port of the beamforming weights matrix and the respective antenna element.

As shown in FIG. 7, sounding tones may be generated 28 and passed through a beamforming weights matrix 26 which has the weights set to known predetermined values, and previously calculated transmit chain correction factors 33 may be applied to the output of the beamforming weights matrix 26, to which the respective phase shift values 25 are applied. The phase shifted signals for each element may then be applied to the calibrated module 27 for transmission. This architecture has the advantage that it can be used both in sounding mode as described, and in MU-MIMO transmit mode, in which weights are applied to the beamforming weights matrix to produce MU-MIMO beam patterns, and modulated data for transmission is applied to the beamforming weights matrix instead of sounding tones. However, in sounding mode, the applied phase shift values are removed 37 from the sampled signals used to calibrate the transmit chains, so that the correction factors 33 are unaffected by the application of the phase shifts.

As shown in FIG. 7, the gyroscopic sensor 12 may be a rate gyro, which measures rate of change of angle. The gyroscopic sensor may be a MEMS gyroscope, for example a micro-chip packaged MEMS gyroscope. The output may then be integrated 34 to give an angle and then high pass filtered 35 to remove a long term mean value, typically to remove a mean generated for a period of 20 s or more. The azimuth angle generated may then be converted to a radiofrequency phase angle for each respective element. This may correspond to a linear phase front across the array for a simple case of a regularly spaced antenna array, the incremental phase shift per element depending on the spacing between the antenna elements in wavelengths and the angle through which the beam is to be shifted.

Sounding tones may be generated in the frequency domain in an embodiment of the disclosure, for example in the following manner. In this example, an OFDM test symbol is generated for each transmit chain, each respective OFDM test symbol comprising a respective set of energised subcarriers, that is to say sounding tones. The sounding tones for a given transmit chain are not used for the other transmit chains. This allows the test symbols to be received without interference between the test symbols. The signals from each transmit chain are combined into a combined channel, and a combined OFDM symbol is received in the combined channel, the combined OFDM symbol comprising respective subcarriers, that is to say sounding tones, transmitted by respective transmit chains. Each transmit chain may be calibrated based on the received respective subcarriers in the combined OFDM symbol. This allows a simple receiver architecture to be implemented using a combiner, and reduces test time by enabling the test symbols to be received simultaneously without interference between the test symbols.

As an alternative, other sounding tones may be used, provided that it is possible to determine the transmission amplitude and phase for each transmit chain from the combined symbol or a series of combined symbols. For example, the sounding tones may be arranged such that the relationship between OFDM test symbols may be characterised by a Hermitian matrix, so that orthogonal results may be derived for each channel.

The calibrating of the transmission phase and gain of respective transmit chains may be performed periodically as part of a time frame sequence including time frames for the transmission of payload data. This allows variations of the gain and/or phase of the transmit chains with time and/or temperature to be calibrated.

The period between performance of calibration may be less than or equal to 64 time division duplex frames, and may be 8 to 32 time division duplex frames, typically 16 frames. This has been found to offer a good trade-off between calibration accuracy and throughput of payload data, which may be inhibited during calibration.

In a time division duplex system, downlink signals transmitted from an access point and uplink signals transmitted from a subscriber module are transmitted at the same frequency. Alternating fixed-duration time periods, known as time division duplex frames, are allocated for uplink and downlink transmission respectively. A time division duplex frame is typically divided into timeslots, each timeslot typically being for communication with a subscriber module, or in the case of MU-MIMO operation, with a group of subscriber modules. Calibration of transmit chains using of sounding tones may be performed within a timeslot.

Figure 8:
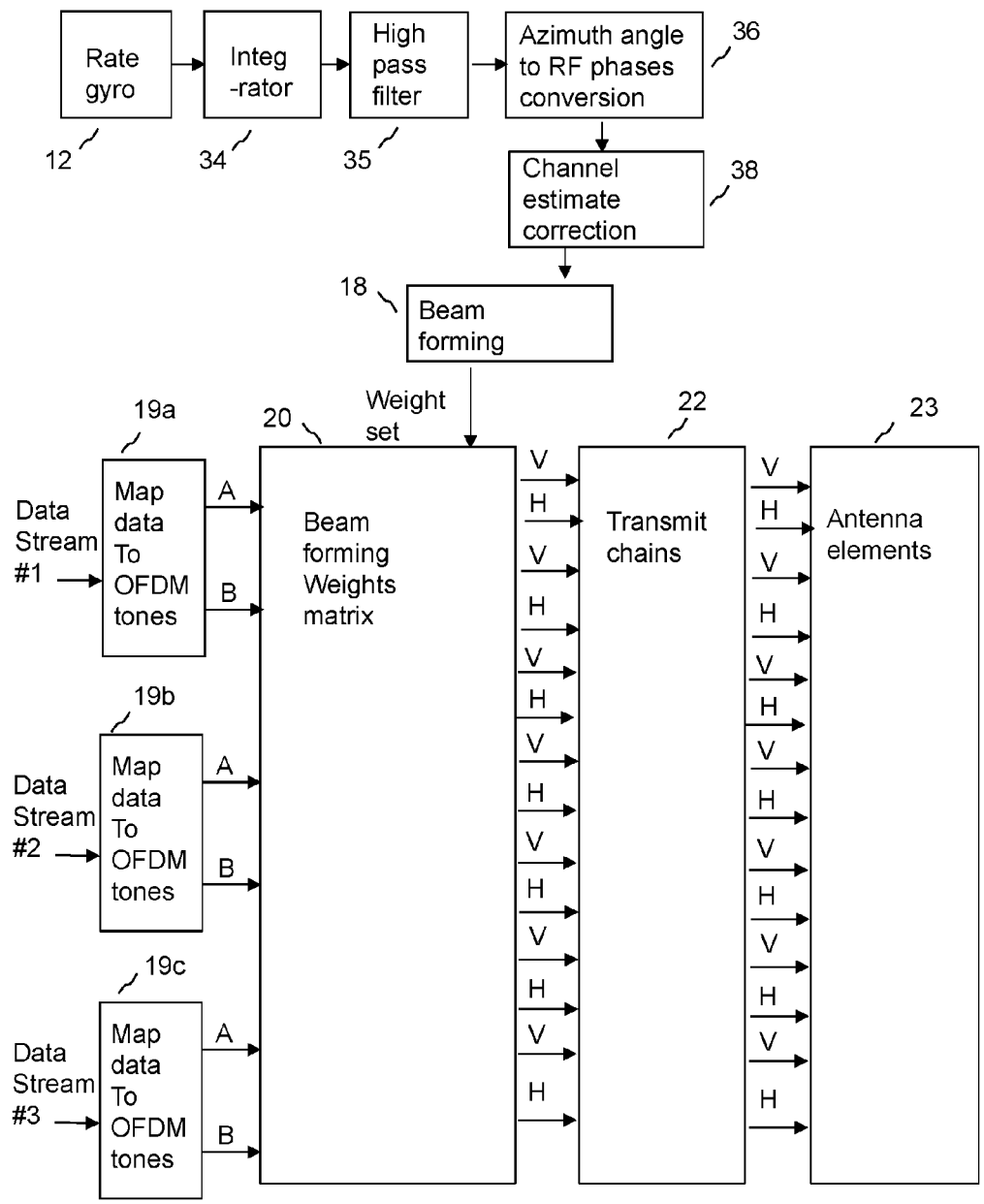
FIG. 8 is a schematic diagram showing a transmit architecture of an access point in which phase corrections are applied to channel estimates used to generate beamforming weights for a MU-MIMO beam pattern.

FIG. 8 is a schematic diagram showing a transmit architecture of an access point in which phase corrections are applied to channel estimates used to generate beamforming weights for a MU-MIMO beam pattern. This provides an alternative technique to that of architectures, such as those illustrated by FIGS. 4 to 7, in which respective phase shifts are applied to each element of the output and/or input of the beamforming weights matrix. Instead, the output of the gyroscope is used to correct channel estimates 38, so that corrected channel estimates may be used in beamforming 18 to calculate a weightset for the beamforming weights matrix 20 that is corrected for a change in orientation of the array. For example, channel estimates may be corrected for a deviation of the array from a reference angle when the channel estimate was taken. The reference angle may be, for example, a long term average of azimuth angle. The channel estimates may be measured at a subscriber module on the basis of the reception of a sounding symbol comprising known amplitudes and phases of OFDM subcarriers transmitted from each element of the array at the access point. The measured amplitudes and phases may be fed back from the subscriber module to the access point, and the channel estimates may be calculated by comparison with the known transmitted signal. If the orientation of the array is disturbed from the reference position when the sounding symbol is transmitted, then this will affect the amplitudes and phases received from each element of the array by the subscriber module. This may be corrected by applying a respective radiofrequency phase correction to the respective estimates for each element of the array. The radiofrequency phase correction may be calculated from the azimuth phase as measured using the gyro. The calculation may take into account the azimuth angle to the subscriber module, which allows a more accurate calculation to be performed than would be the case if the azimuth angle were unknown. When a weightset is calculated for the beamforming weighting matrix to form a MU-MIMO beam pattern, the channel estimates used to calculate the weightset may be corrected with radiofrequency phase corrections according to the measurement of azimuth angle, as a deviation of the reference angle, based on the output of the gyro for the time when the MU-MIMO beam pattern is transmitted.

The relationship between the relative radiofrequency phase and the azimuth angle of the subscriber module to the array may be calculated on the basis of path lengths, measured in terms of wavelength, from the geometry of the array. The RF phase slope across the array is typically proportional to the sine of the beam azimuth angle assuming boresight, that is to say an angle normal to the array, corresponds to an azimuth of 0 degrees. The radiofrequency phase slope correction across the array, due to disturbance of the array from the reference position, is typically proportional to the cosine of the beam azimuth angle to the subscriber module, again assuming boresight corresponds to an azimuth of 0 degrees. If the azimuth angle to a subscriber module for a particular channel is known, then correction for deviation of the array from the reference position may take into account the cosine dependence, increasing the accuracy.

So, forming the MU-MIMO beam pattern may comprise correcting each measured respective signal propagation characteristic for a change in orientation of the array between a first time interval, when a channel estimate is measured, and the a second time interval, when the MU-MIMO beam pattern is transmitted and/or received, based on first phase corrections based on processing the output of the gyroscopic sensor in the first time interval, and on the second phase corrections, based on processing the output of the gyroscopic sensor in the second time interval. A weightset may be generated for the beamforming weights matrix based on the corrected measured respective signal propagation characteristics.

Figure 9:
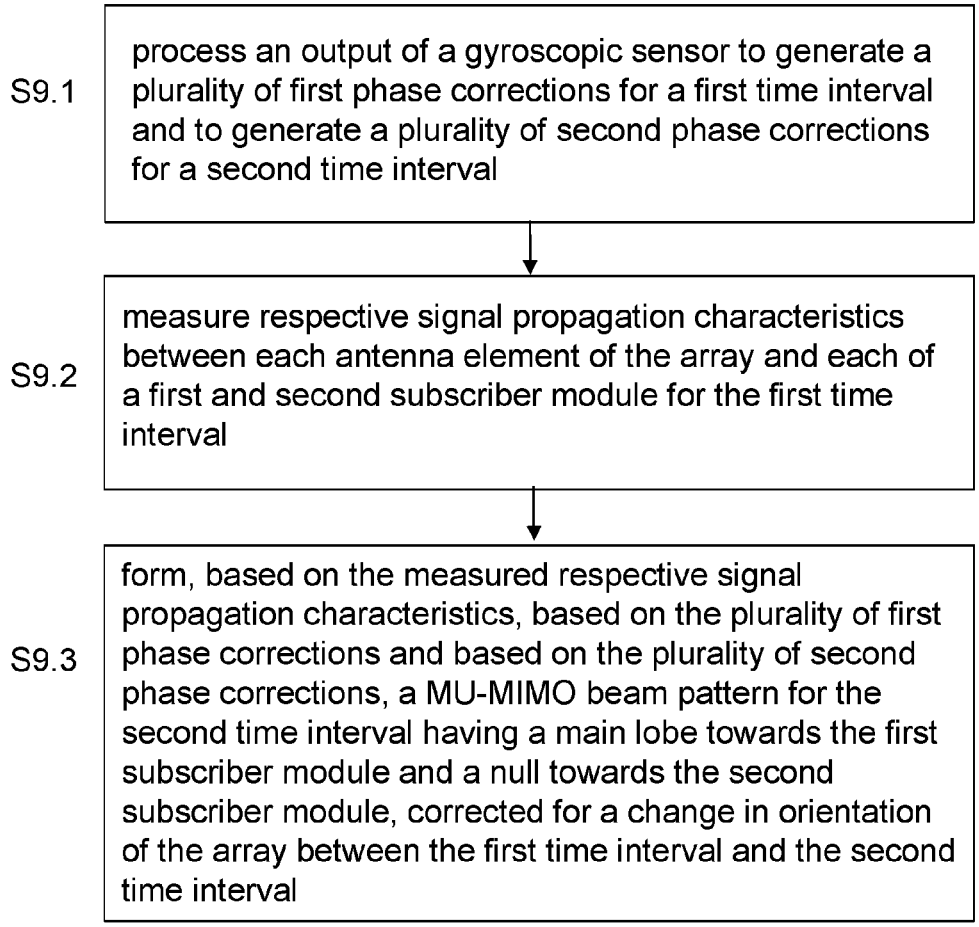
FIG. 9 is a flow chart of a method of stabilising at least one Multi User Multiple Input Multiple Output MU-MIMO beam pattern formed by an array of antenna elements at an access point of a point to multi-point wireless communication network in an embodiment of the disclosure.

FIG. 9 is a flow chart of a method of stabilising at least one Multi User Multiple Input Multiple Output MU-MIMO beam pattern formed by an array of antenna elements at an access point of a point to multi-point wireless communication network comprising a plurality of subscriber modules, the access point being configured to form the MU-MIMO beam pattern by applying a weightset to a beamforming weights matrix, in an embodiment of the disclosure, comprising steps S9.1 to S9.3.

Figure 10:
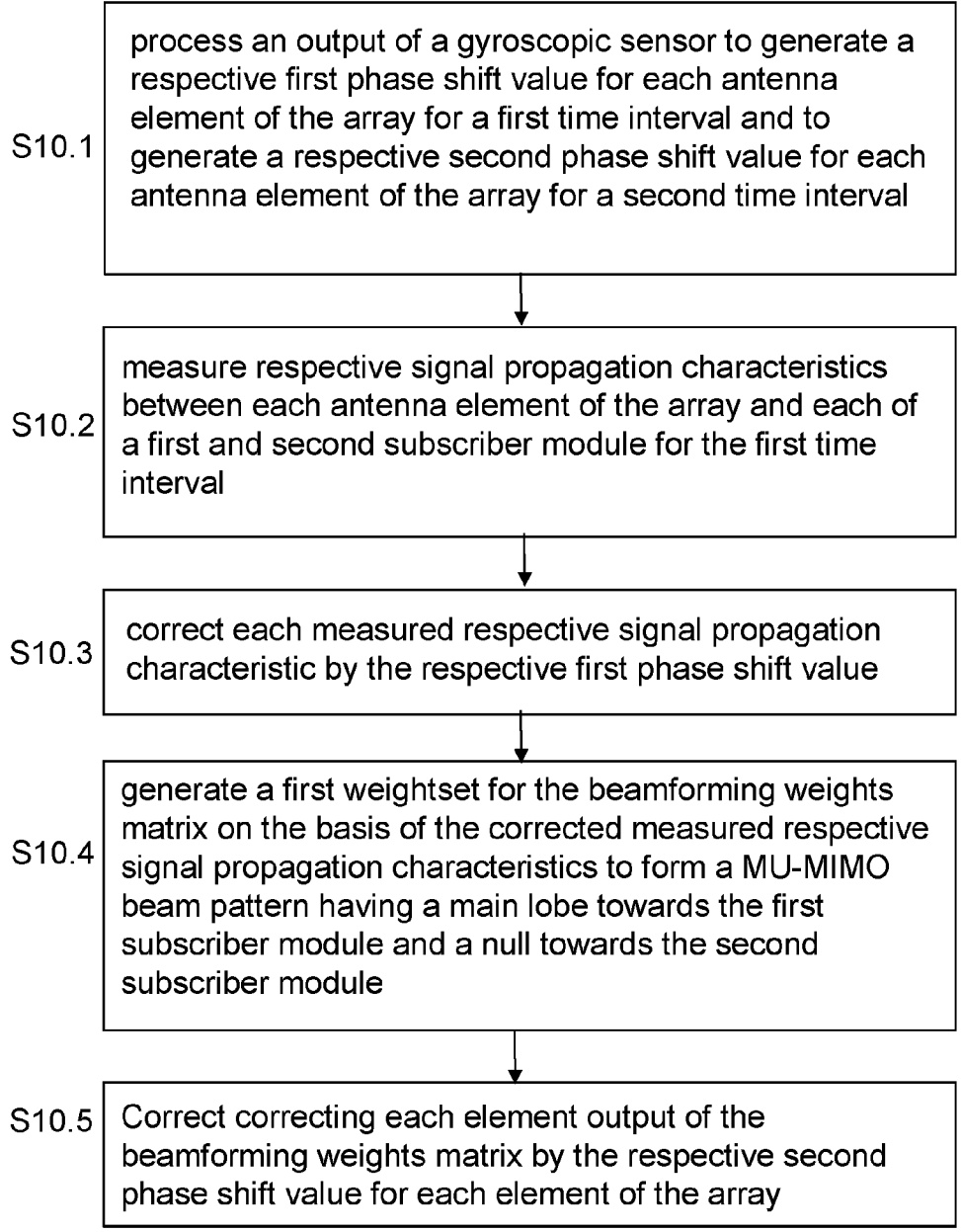
FIG. 10 is a flow chart of a method of stabilising at least one Multi User Multiple Input Multiple Output MU-MIMO beam pattern in which phase corrections are applied to an output and/or input of a beamforming weights matrix.

FIG. 10 is a flow chart of a method of stabilising at least one Multi User Multiple Input Multiple Output MU-MIMO beam pattern in which phase corrections are applied to an output and/or input of a beamforming weights matrix in an embodiment of the disclosure, comprising steps S10.1 to S10.5.

Figure 11:
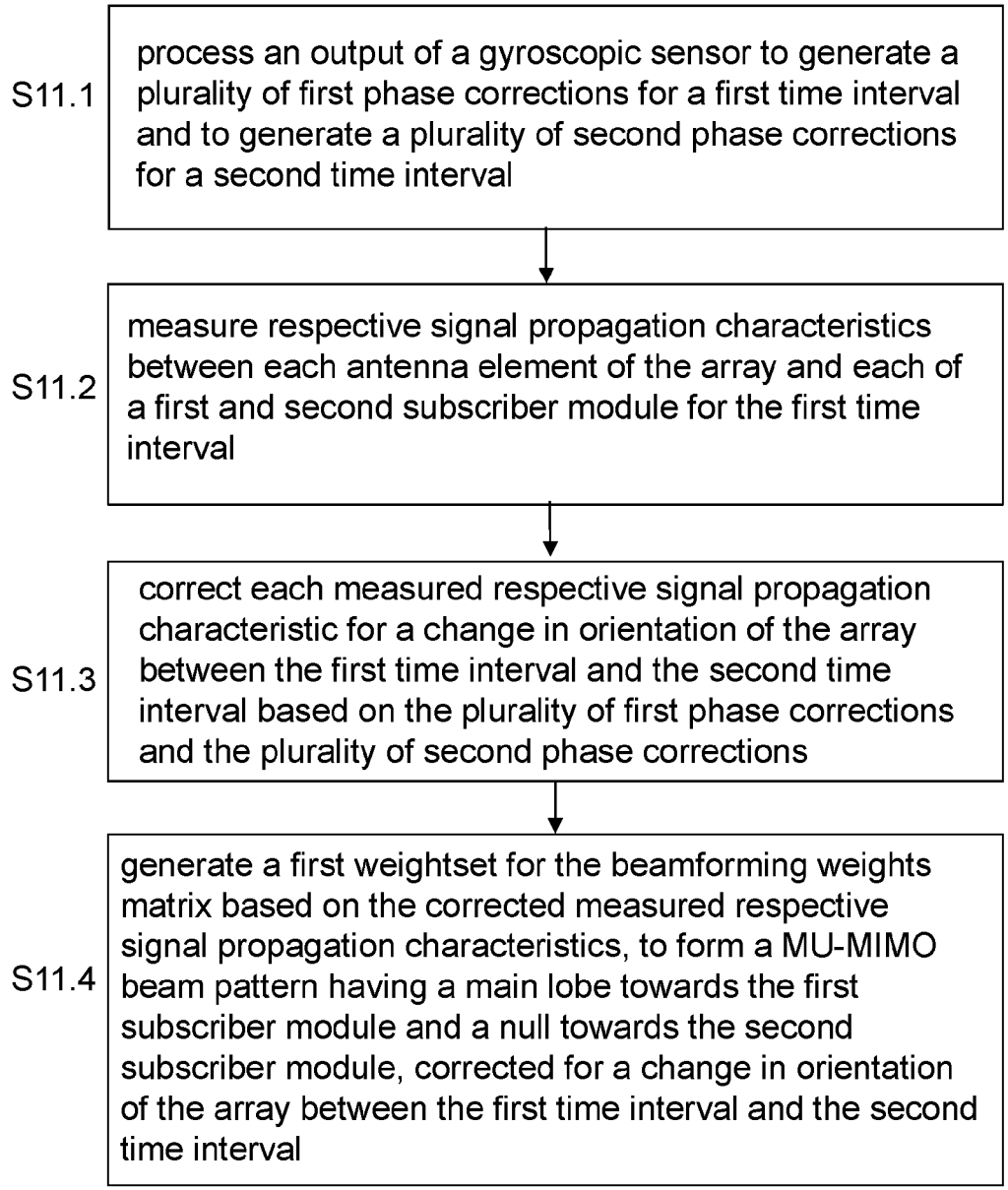
FIG. 11 is a flow chart of a method of stabilising at least one Multi User Multiple Input Multiple Output MU-MIMO beam pattern in which phase corrections are applied to channel estimates used to generate beamforming weights for a MU-MIMO beam pattern.

FIG. 11 is a flow chart of a method of stabilising at least one Multi User Multiple Input Multiple Output MU-MIMO beam pattern in which phase corrections are applied to channel estimates used to generate beamforming weights for a MU-MIMO beam pattern in an embodiment of the disclosure, comprising steps S11.1 to S11.4.

It will be understood that the method of embodiments of the disclosure may be implemented by a processor, which may comprise program code held in a memory configured to cause the processor to perform the method. The processor may comprise one or more digital signal processors, and/or programmable logic arrays.

Each weightset may comprise respective amplitude and phase values for respective signal streams for respective antenna elements for respective subcarriers of an OFDM symbol. This allows beamforming to take into account frequency dependent effects.

The isolation between each antenna element may be at least 30 dB at an operating frequency of the antenna elements. This allows an accurate model of the MU-MIMO beam pattern and the phase shift values for correction due to change in the orientation of the array to be determined without modelling interaction between antenna elements.

In an embodiment of the disclosure, the circuit design and physical layout of the radio frequency transmission paths are the same for each antenna element, in particular for each transmit chain and the path from each transmit chain to the respective antenna element. This allows an accurate calculation of a MU-MIMO beam pattern and the respective phase shift factors to correct for the orientation of the array, because unknown radio frequency characteristics will be the same for each antenna element and so may not affect a calculated array gain. In an embodiment of the disclosure, the physical layout of said unit provides a fixed spacing between the radio frequency transmission paths for each antenna element.

In a fixed wireless access system the subscriber module may be typically mounted to a structure such as a building, typically on the outside of a building in a position that gives good radio reception to an access point. The access point 1 may be located at a convenient point to serve a number of subscriber units. For example the access point, or the antennas for the access point, may be mounted on an antenna tower, and may provide Internet access to a neighbourhood.

The subscriber modules 2, 4, 5 shown in FIGS. 1, 2 and 3 may have antennas which have an aperture defined for example by a reflector, and each antenna element may comprise a probe for receiving and/or transmitting a respective polarisation from/to the aperture. The antenna is typically installed so as to align the peak of the transmit/receive radiation pattern in the direction of the access point 1, which is typically installed on a tower. A command sent to each subscriber module may comprise a map indicating a scheduling of radio resource and/or polarisation to the subscriber module as a function of time. The map may indicate respective allocations to several subscriber units as a function of time, typically all subscriber units served by an access point. The map may indicate, for example, time, polarisation, and/or frequency allocation for transmission and/or reception. The scheduling of radio resource and polarisation may be updated periodically, the period between updates being determined by a scheduler at the access point.

A specific example of an access point according to an embodiment of the disclosure is given by a point-to-multipoint (PMP) Access Point (AP) with a seven-element dual-polarised adaptive array smart antenna and multi-user MIMO (MU-MIMO) capabilities. This example will now be described in more detail. It will be understood that embodiments of the disclosure are not limited to this example. The access point in this example is designed for outdoor deployment as an AP with sector coverage in a PMP network. Units may be deployed in multiples to provide 360° coverage from a tower or rooftop. The access point may be a complete radio transceiver operating in the frequency range 5150 MHz to 5925 MHz, using Time Division Duplex (TDD) separation of the uplink and downlink directions.

The access point may include an integrated dual-polarised seven-element adaptive array smart antenna. Seven identical dual-polarised antenna elements and 14 associated transceiver chains may be contained within a single rigid assembly, with each antenna element connected directly to two transceiver chains using printed conductors and wireless via connections. The integration of the components ensures that the spacing and alignment of the antenna elements is known and constant.

Each antenna element may consist of a vertical column of eight radiating patches and separate passive feed networks for horizontal and vertical polarisations. A single element may have a relatively narrow beamwidth (about 8°) in the elevation direction, and a broader beamwidth (about 80°) in the azimuth direction. The gain of each antenna element (that is to say, each column of eight patches) is about 14 dBi. The overall antenna assembly may contain 56 patches, in an array that is seven elements (seven patches) wide and one element (eight patches) high.

The antenna array may provide high isolation between antenna elements. The coupling loss between antenna elements may be greater than 30 dB; this enables the device to model smart antenna operation more accurately.

The integrated assembly in this example does not make use of any connectors between the antenna elements and the associated electronics, and does not provide any test points that could be used to make conducted measurements.

In this example, the maximum output power of a single transmitter chain is about 10 dBm, or 13 dBm for each dual-polarised pair of chains The associated Subscriber Module (SM) devices may contain a directional dual-polarised antenna with two transceiver chains. The SMs may support a single data stream using polarisation diversity or polarisation multiplexing. In MU-MIMO operation, the AP may support several (up to seven in this example) parallel data streams, where each stream is associated with a different SM device.

The access point may use the MU-MIMO mode to transmit and receive data in several parallel streams where each stream involves a different SM.

The MU-MIMO operation consists of beamforming to maximise the uplink and downlink signal in one stream for each wanted SM, and null-steering to minimise the uplink and downlink signals for SMs that are associated with the other parallel streams. The resulting antenna beams will necessarily be at different azimuth angles such that the antenna beams are substantially non-overlapping.

The MU-MIMO smart antenna mode may be invoked when suitable orthogonal groups of SMs have been identified, and where buffered data is queued, ready to be transmitted to or received from these SMs.

Control functions in the AP may automatically reduce the digital transmit gain to compensate for array gain in the MU-MIMO mode, ensuring that the radiated power at any azimuth angle is less than the power allowed by the relevant rules.

The access point may use the sounding mode to characterise the channel between each of the antenna elements and each of the SMs. The sounding mode is also used to calibrate the gain and phase of each of the AP transmit chains.

In the sounding mode each OFDM tone may be energised in only one of the 14 chains in this example. It follows from this that all the smart antenna outputs are intrinsically uncorrelated in this smart antenna mode.

The access point may support at least two MIMO modes, namely: Polarisation diversity, using cyclic delay diversity (CDD); and Polarisation multiplexing.

In the polarisation diversity MIMO mode, the same data is present in both polarisations during the same symbol period, and the two channels are therefore considered to be partially correlated. In the polarisation multiplexing MIMO mode, the data stream is shared between the two polarisations, and the two channels are therefore considered to be completely uncorrelated.

The channel conditions needed for MU-MIMO operation are similar to the channel conditions needed for polarisation multiplexing, and the combination of polarisation diversity and MU-MIMO operation may occur relatively rarely.

Returning to FIG. 4, the first stage 19a, 19b, 19c shown here maps a sequence of the serial data into separate A and B channels using polarisation diversity (where the same data is present in each channel) or polarisation multiplexing (where the data is divided between two channels), and for each the two channels maps the data into the amplitude and phase coordinates of a set of OFDM tones representing a single OFDM symbol.

The coordinates of the A and B tone sets may then be each multiplied by a set of 14 amplitude and phase weights generated by a beamforming function to create seven H and seven V inputs to the following stage.

In each of the 14 transmitter chains, the weighted tone sets are passed to the IFFT stage to generate a series of in-phase and quadrature time-domain samples for an OFDM symbol. The unit then adds a complex cyclic prefix to the time domain signals and converts the I and Q signals to analogue waveforms. The analogue signals are applied to an up-converter to provide the modulated RF output.

The 14 modulated RF signals are then amplified and applied in pairs to the H and V ports of the seven dual-polarised antenna elements.

For MU-MIMO operation, the weights matrix supports multiple independent data streams, and each data stream is applied to the 14 transceiver chains according to the amplitude and phase weights.

FIG. 4 shows three data streams, so that the weights matrix has dimension 6×14. The unit supports up to seven parallel data streams, meaning that the weights matrix could have dimension 14×14.

The Sounding mode may be used to calibrate the gain and phase of each of the AP transmit chains up to the output of the RF power amplifiers. The amplitude of the transmitted signal is determined by coupling all of the transmitter signals into an accurate detector, and by passing the composite signal into an additional OFDM receiver stage. The device is able to calibrate each transmitter chain by considering the amplitude and phase of each of the 14 sets of OFDM tones separately. As shown in FIGS. 6 and 7, the phase shifts used to correct for the orientation of the antenna array may be removed before comparison of the received sounding tones with the predetermined sounding tones which were passed through the transmit chains, so that the correction factors are not affected by the gyroscopic stabilisation.

Transmitter gain may be adjusted by a combination of analogue gain adjustments in the RF stages and digital gain and phase adjustments in the calculation of weights in the combining matrix. Analogue gain may be adjusted in a calibration sequence at initialisation of the device, and whenever the maximum transmitted power is changed by the operator. Thereafter, adjustments may be made solely by changing the digital gain in the weights matrix, except that an additional analogue adjustment may occasionally be needed to maintain the desired dynamic range of the digital signals. Analogue adjustments may be avoided as far as possible because MU-MIMO operation may need to be temporarily suspended whilst the adjustment is made.

The application firmware in the access point may compute the transmitter gain, and amplitude and phase weights for the combining matrix, to provide the required sector, single beam or MU-MIMO beam patterns. This operation is based on an accurate model of smart antenna operation, in which the resultant signal strength at any azimuth angle is determined as the superposition of the signals radiated by the individual antenna elements. This model may automatically and intrinsically allow for array gain in the smart antenna.

The accuracy of the prediction of the behaviour of the system by the model for MU-MIMO beamforming, and of the generation of respective phase shift values for the correction for the orientation of the array, may be contributed to by the following factors: the seven antenna elements and the 14 transmitter chains are substantially identical; the spacing between the antenna elements is equal and fixed; the antennas cannot be changed by an installer, and there are no antenna cables that could be changed or disconnected; the model includes the frequency-dependent polar response of a single antenna element; the amplitude and phase response of the transmitter chains is regularly calibrated; the calibration process measures and counters differences between chains that arise because of manufacturing spread, frequency or operating temperature; and the antenna elements are effectively isolated from each other so that interaction between elements is minimal, so that the assumption of superposition is realistic.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

What is claimed is:

1. A method of stabilising at least one Multi User Multiple Input Multiple Output MU-MIMO beam pattern formed by an array of antenna elements at an access point of a point to multi-point wireless communication network comprising a plurality of subscriber modules, the method comprising:
generating an output of a gyroscopic sensor to indicate a rate of change of an orientation of the array of antenna elements;
processing the output of the gyroscopic sensor to generate an azimuth angle;
converting the azimuth angle to a respective radiofrequency phase angle for each respective element of the antenna array to give a linear phase front across the array having an incremental phase shift per element related to the azimuth angle by a respective predetermined factor;
applying a respective phase correction having the respective radiofrequency phase angle to each respective element output of a MU-MIMO digital beamforming weights matrix having pre-determined weights, whereby to apply the linear phase front across the array;
applying respective further correction factors to each output of the MU-MIMO digital beamforming weights matrix to which the respective phase correction has been applied to correct for respective signal transmission characteristics between each respective output of the MU-MIMO digital beamforming weights matrix and the respective antenna element; and
generating the respective further correction factors by measuring respective signal propagation characteristics between each respective output of the MU-MIMO digital beamforming weights matrix and the respective antenna element by a process comprising:
coupling a sample from each signal transmitted from each output of the beamforming weights matrix to each respective antenna element;
removing the respective phase correction from each coupled sample; and
updating the respective further correction factors on the basis of the coupled samples with the respective phase correction removed.

2. A method according to claim 1, comprising:
generating respective first phase corrections for a first time interval and respective second phase corrections for a second time interval based on a single approximation factor relating a change in array orientation to a change in radiofrequency phase.

3. A method according to claim 2, comprising forming the at least one MU-MIMO beam pattern by:
measuring respective signal phase and amplitude propagation characteristics between each antenna element of the array and each of a first and second subscriber module for the first time interval;
correcting each measured respective signal phase and amplitude propagation characteristic by the respective first phase correction; and
forming a MU-MIMO beam pattern for the second time interval having a main lobe towards the first subscriber module and a null towards the second subscriber module by:
generating weights for the MU-MIMO digital beamforming weights matrix based on the corrected measured respective signal phase and amplitude propagation characteristics.

4. A method according to claim 1, wherein the array of antenna elements is an integral part of the access point, and the gyroscopic sensor is mounted within the access point.

5. A method according to claim 4, wherein the access point comprises a calibrated integrated module comprising transmit chains and the array of antenna elements.

6. A method according to claim 4, wherein the access point is mounted on an antenna tower and said change in orientation of the array is due to wind.

7. A method according to claim 6, wherein said change in orientation of the antenna array is a change in azimuth angle.

8. A method according to claim 1, wherein the gyroscopic sensor is a rate gyro, and said output of the gyroscopic sensor is an angular rotation rate.

9. A method according to claim 8, wherein processing the output of the gyroscopic sensor comprises:
   integrating the angular rotation rate and removing a mean value to determine the azimuth angle; and
   determining the respective phase correction for each antenna element of the array from the azimuth angle and from stored data regarding the geometry of the array.

10. A method according to claim 2, wherein the first time interval is a first time division duplex period and the second time interval is a subsequent time division duplex period.

* * * * *